(12) United States Patent
Bonin

(10) Patent No.: US 6,186,778 B1
(45) Date of Patent: Feb. 13, 2001

(54) DEVICE FOR DRIVING A CYLINDER IN ROTATION

(75) Inventor: Jacques Louis Bonin, Chamforgueil (FR)

(73) Assignee: Technip, Courbevoie (FR)

(*) Notice: Under 35 U.S.C. 154(b), the term of this patent shall be extended for 0 days.

(21) Appl. No.: 09/355,627

(22) PCT Filed: Dec. 4, 1998

(86) PCT No.: PCT/FR98/02628
§ 371 Date: Jan. 5, 2000
§ 102(e) Date: Jan. 5, 2000

(87) PCT Pub. No.: WO99/30095
PCT Pub. Date: Jun. 17, 1999

(30) Foreign Application Priority Data

Dec. 5, 1997 (FR) .................................................. 97 15418

(51) Int. Cl.⁷ ......................................................... F27B 7/26
(52) U.S. Cl. ........................... 432/118; 432/103; 248/130
(58) Field of Search .................................... 432/103, 118, 432/124; 34/121; 198/618; 248/130

(56) References Cited

U.S. PATENT DOCUMENTS

| | | | |
|---|---|---|---|
| 2,819,130 | 1/1958 | Kaminsky | 308/234 |
| 3,027,553 | 3/1962 | Sandor | 340/269 |
| 3,966,395 | 6/1976 | Schneider et al. | 432/103 |
| 4,030,878 | * 6/1977 | Kunath | 432/103 |
| 4,344,596 | * 8/1982 | Hjaeresen | 432/103 |
| 5,890,814 | * 4/1999 | Catlett | 432/103 |

FOREIGN PATENT DOCUMENTS

| | | |
|---|---|---|
| 1 092 365 | 12/1958 | (DE) . |
| 39 05 345 | 7/1989 | (DE) . |
| 631 665 | 12/1927 | (FR) . |
| 2 242 890 | 3/1975 | (FR) . |
| 2 677 419 | 12/1992 | (FR) . |

* cited by examiner

Primary Examiner—Denise L. Ferensic
Assistant Examiner—Gregory A. Wilson
(74) Attorney, Agent, or Firm—Pennie & Edmonds LLP

(57) ABSTRACT

The invention relates to a device for driving a cylinder in rotation about its longitudinal axis, and includes a ring gear perpendicular to the cylinder axis; truncated rollers arranged on each side of the ring gear, at least one of which is a drive roller; and at least one actuator acting on at least one roller for pressing it on the ring gear. The actuator supports and the roller supports are linked to a common structure capable of moving to respond to the movements and possible direction changes during its operation. The invention is specifically applicable for a rotary furnace for firing minerals.

15 Claims, 4 Drawing Sheets

DEVICE FOR DRIVING A CYLINDER IN ROTATION

TECHNICAL FIELD

The present invention relates to a device for driving a cylinder in rotation about its longitudinal axis the cylinder being such as a furnace for firing minerals. in particular a cement furnace.

BACKGROUND OF THE INVENTION

It is known that cement furnaces are large in both length and diameter and that this causes problems at the level of the furnace supports and the driving device since the furnace must be able to permanently rotate about its longitudinal axis.

The weight of the furnace, which comprises the outer metal casing, the inner refractory lining and the material being processed, is such that a bending strain of the oven is observed between the support points and even beyond. To limit the bending strain to acceptable levels, it is necessary to provide a sufficient number of supports. Dry process furnaces using preheaters are generally provided with three supports.

In addition to these permanent dynamic deformations provided for under normal operating conditions accidental events, such as local overheating or prolonged idle times, can sometimes cause exceptional deformations that are more significant in nature.

In the case of furnaces provided with three supports, these exceptional deformations can be such that when in rotation, the furnace only rests on two of the three supports, thus creating, firstly dangerous overloading in view of the mechanical strength of the supports and secondly, variations in the span (or contact surfaces) between the teeth of traditional gear drive mechanisms, a part of which is integral with the furnace while the other is fixed: this is also dangerous in terms of the mechanical performance of the systems.

With the evolution of firing processes using pre-calcinators, it has become possible to reduce the length of rotary furnaces and consider the use of only two supports: this solution has the advantage of reducing the number of mechanical parts but also of limiting the risks of a support being overloaded in the case of exceptional deformation of the furnace.

With furnaces using two supports, the problem of overloading the supports in the case of exceptional deformation is avoided but the span of the supports between the fixed roller supports and the runner surfaces which are subjected to the deformations of the furnace is no longer appropriately guaranteed due to lack of parallelism.

With furnaces using two supports, problems due to variations in the span between the teeth of traditional gear drive mechanisms are as critical as with furnaces using three supports, in the case of exceptional deformations.

To compensate for these problems it was considered, for furnaces using two supports (EP-A-0570696), to create articulated supports such that roller bearings having both driving and supporting functions could respond to deformations of the furnace. However, such a facility is complex to implement and maintain.

SUMMARY OF THE INVENTION

It is thus an object of the present invention to provide a driving device that is independent from the support surfaces and that can respond to deformations of the furnace as well as to its longitudinal movements and, more generally, to deformations of any device having the elongated shape of a cylinder or a tube, the support surfaces having no driving function but being advantageously capable of being articulated so as to respond to deformations of the furnace (or of any equivalent device).

In addition to the advantage of avoiding the use of the expensive supports mentioned above, the invention has a number of other advantages in particular those of:

reducing civil engineering work, as the driving device of the furnace no longer requires a significant foundation.

replacing the single big motor currently used with several smaller motors that are more modest, less expensive and easier to obtain, simplifying maintenance with minimal amounts of lubricants required compared with the quantity used with gear and pinion systems The device according to the invention for driving a cylinder in rotation about its longitudinal axis said cylinder resting on raceways permitting said rotation. is characterised in that it comprises:

a) at least one ring gear (2) having side faces that are substantially parallel to each other and substantially radial from (perpendicular to) the cylinder axis, said gear being substantially concentric with the cylinder and being arranged outside the cylinder and connected thereto by securing means (3) capable of withstanding distance variations between the cylinder and the ring gear.

b) one or more modules each comprising a rigid structure (16), even numbers of truncated rollers (4, 5), and supports (27, 21) for the truncated rollers, said truncated rollers being capable of rotating about their longitudinal axes (6, 7) and being connected to their supports through ball or plain bearings, said truncated rollers having their generators (37, 38) intersect substantially on the cylinder axis at a point (C) which is substantially the center of the ring gear and being arranged in facing pairs on either side of the side faces of the ring gear and being capable of pressing on said side faces, at least one of the rollers being a drive roller whose function is to transmit a driving force to the ring gear, c) at least one actuator (30) for each pair of rollers, capable of exerting, through the roller supports, enough direct or indirect pressure on the rollers of said pair to firmly press said rollers against the ring gear and to enable them to drive both the ring gear and the cylinder in rotation, the actuator supports and the roller supports of each module being connected to said rigid structure, which comprises means (22) allowing it to move and change direction in response to the movements and direction changes experienced by the ring gear during its operation.

It is to be understood that the rollers referred to in the present description are drive rollers of the ring gear, with the exclusion of any other rollers that may be used in other parts of the facility and in particular with the exclusion of the rollers bearing the cylinder.

BRIEF DESCRIPTION OF THE DRAWINGS

The invention is further described with reference to FIGS. 1 to 4 which are given as examples and are in no way limiting on the scope of the invention.

Preferred embodiments of the invention will now be described, by way of example only.

DETAILED DESCRIPTION OF THE INVENTION

Preferably, two actuators are used for each mobile roller support, the two actuators being situated in the same plane, substantially perpendicular to the ring gear.

Using two actuators ensures the proper application of the generator of the roller on the furnace ring gear.

The position of the two actuators is such that the forces transmitted to the roller go through the bearing of the roller.

The two actuators allow the roller to move freely so as to respond to any tilting of the ring gear resulting from deformations of the rotary furnace.

They also make it possible to have a perfectly stable assembly, capable of withstanding, without tilting, the tangential stress due to the driving action.

The support of each roller of a pair of rollers may be articulated relative to the rigid structure.

The support of one of the rollers of a pair of rollers may comprise at least one actuator and will be mobile relative to the rigid structure, the support of the second roller of the pair being made integral with the rigid structure through at least one mechanical adjusting element such as a set screw (39) or any other mechanical means.

Preferably, each roller support that is integral with the rigid structure uses two adjusting elements or one adjusting element and one actuator, both being situated in the same plane, substantially perpendicular to the ring gear.

The rollers operate in pairs and directly or indirectly press against the side faces of the ring gear (also referred to as "circle"). These opposing pressures enable the pinching of the ring gear and transmit the force required to drive the rollers in reverse rotation.

Figure 3:
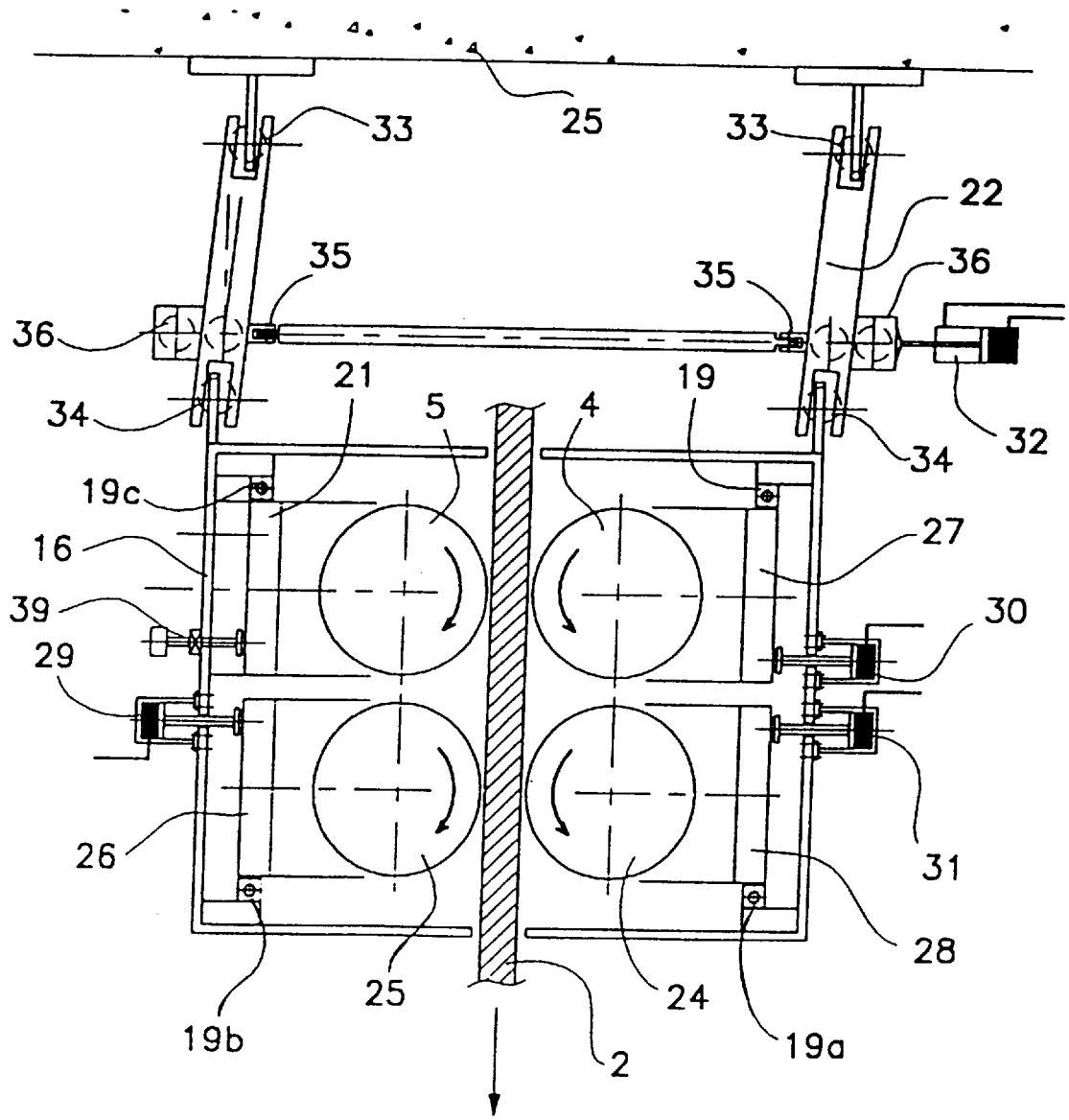
FIG. 3 is a section, in a plane parallel to the furnace axis, of the module that is mobile relative to a fixed attachment point and of the rollers and actuators, where two pairs of rollers are used.

It will be understood that, in this embodiment, the module will be able to move slightly in a direction that is parallel to the cylinder axis as a result of the pinching of the furnace ring gear by the rollers of the module. This movement is facilitated by the use of spherical joints and/or arms connecting the rigid structure to its anchor point such as a block of concrete, for instance. The horizontal stresses due to the tilting of the swivelling arms are compensated by an actuator (FIG. 3).

It will be understood that the connection between the roller support and the rigid structure is a multipoint connection in all cases. In the case of a mobile roller support, a first connection is provided through an articulation and a second connection is provided through one or more actuators. In the case of a roller support integral with the rigid structure, a first connection is also provided through an articulation and a second connection is provided through one or more rigid means (which may however comprise mechanical adjusting means) or through the combination of a rigid means and an actuator. In both cases, the articulation is provided so as to enable one of the attachment points of the roller support to move relative to a fixed attachment point that is integral with the rigid structure when the roller support moves under the action either of one or more actuator(s) or of one or more mechanical adjusting means. Advantageously, the articulation will be of the spherical type.

Advantageously, there is also provided a connection between the motor driving the roller and the rigid structure, the main object of this connection being to absorb the torque generated by the motor. The support role is thus nonexistent or only secondary in this case.

It will also be understood that the module may comprise any even number of rollers that are arranged facing each other on either side of the ring gear for instance 2, 4, 6 or more rollers (i.e. 1, 2, 3 or more pairs).

Another embodiment provides for several modules for instance two or three, that are independent from each other and are circumferentially staggered, each module being fitted with the desired number of roller pairs, if the power to be transmitted is particularly significant and justifies it.

Similarly, the device may comprise several ring gears connected to the cylinder and staggered along its length, each ring gear being provided with the elements described above in relation to a single ring gear.

The roller support according to the invention is understood to be a housing supporting the roller axis at one or more points using bearings such as ball bearings, needle bearings, roller bearings, plain bearings, etc. Preferably, there are two support points, on either side of the roller respectively.

In a more preferred form, the module comprises two pairs of rollers and the support of one roller only is integral with the rigid structure and comprises mechanical adjusting means, while the supports of the other three rollers are each connected to at least one actuator and are mobile relative to the rigid structure.

The module may be suspended and connected to a fixed support through at least one articulation, preferably at least one articulated arm.

The module may moreover comprise at least one actuator allowing it to be moved in a direction that is substantially parallel to the cylinder axis so as to respond to longitudinal movements of the cylinder and/or ring gear.

The cylinder may be a rotary furnace for firing minerals connected to a preheating tower and the ring gear is then located on the upstream overhanging portion of the furnace, on the side of the preheating tower (i.e. not between the bearing surfaces of the furnaces).

The fixed support to which the rigid structure is connected is preferably integral with the building bearing the preheating tower.

The drive roller(s) is (are) rotatably driven by a motor preferably of the hydraulic type, although any other driving device known to those skilled in the art, such as a mechanical or electrical device for instance, may be used.

Advantageously, the contact between the rollers and the ring gear is a friction contact, the rollers and the ring gear being toothless.

Preferred embodiments of the invention will now be described, by way of example only, with reference to the accompanying drawings.

The furnace (1) of axis AA' comprises annular rings preferably two (8. 9), integral with the furnace and acting as rolling parts in cooperation with raceways (10, 11) in the form of bearings that are free to rotate about their axes. The supports of these bearings are represented by reference numbers (12) or (13) (the traditional connecting parts between the bearings and the supports are not represented; they are preferably spherical connections provided for responding to deformations of the furnace).

The relatively thin ring gear (2), also referred to as "circle". is connected to the furnace by securing means (3), for instance straps that are tangential to the furnace (see FIG. 2) and capable of absorbing distance variations between the furnace and the ring gear resulting, in particular, from thermal expansion and deformations of the furnace. The plane of the ring gear is substantially radial, i.e. perpendicular to the furnace axis. Preferably, the ring gear is made up of successive elements that are slantably assembled according to junction lines such as (40). The furnace is horizontal or slightly tilted, so as to form with the horizontal an angle a, as is traditionally the case with cement furnaces.

The truncated rollers (4) and (5) of the "radial" type are capable of laterally pressing on the ring gear. Their generators (37) and (38) and their respective axes (6) and (7) generally converge towards a common point C which is substantially the center of the ring gear, so as to avoid the sliding and wear that would result from the use of cylindrical rollers for instance.

Figure 1:
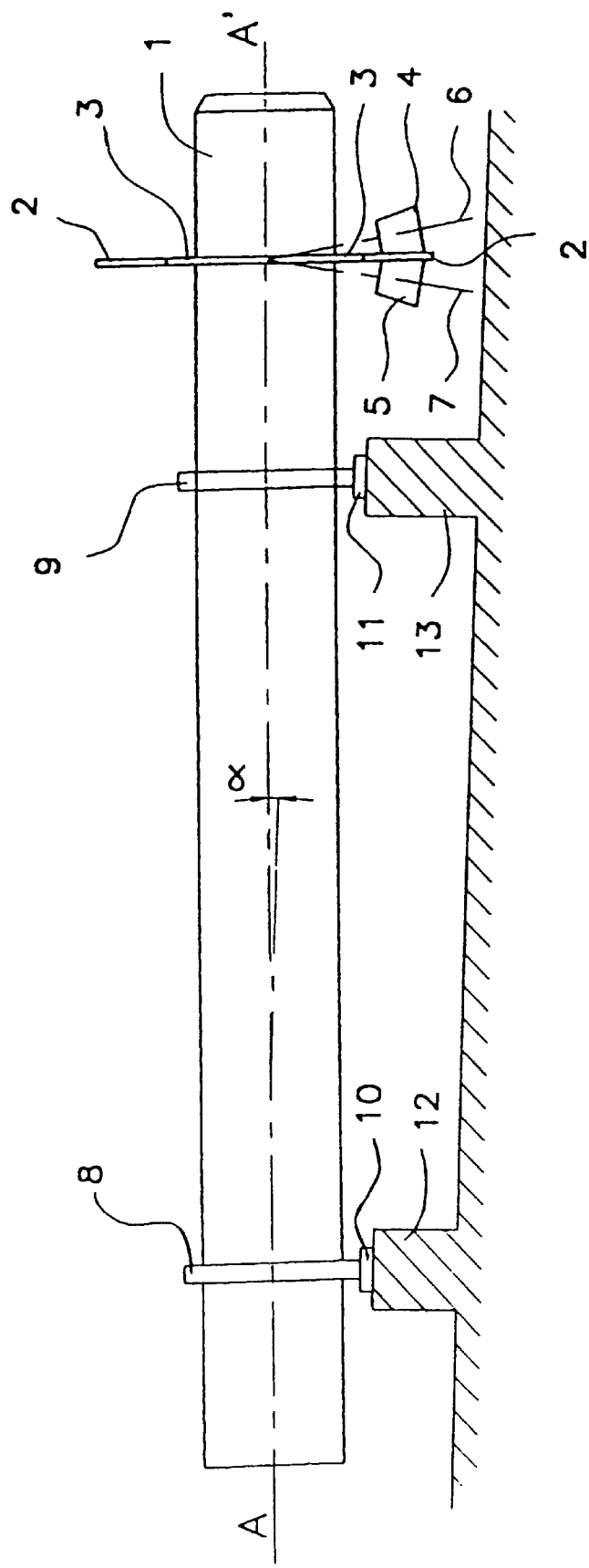
FIG. 1 is a sectional view of a cylinder for instance that of a rotary furnace of AA' axis, comprising two support surfaces and the driving device of the invention.

The rollers and the ring gear are advantageously toothless, the driving action being effected by friction, i.e. by contact under pressure, the pressure resulting from the use of actuators not represented in FIG. 1.

Figure 2:
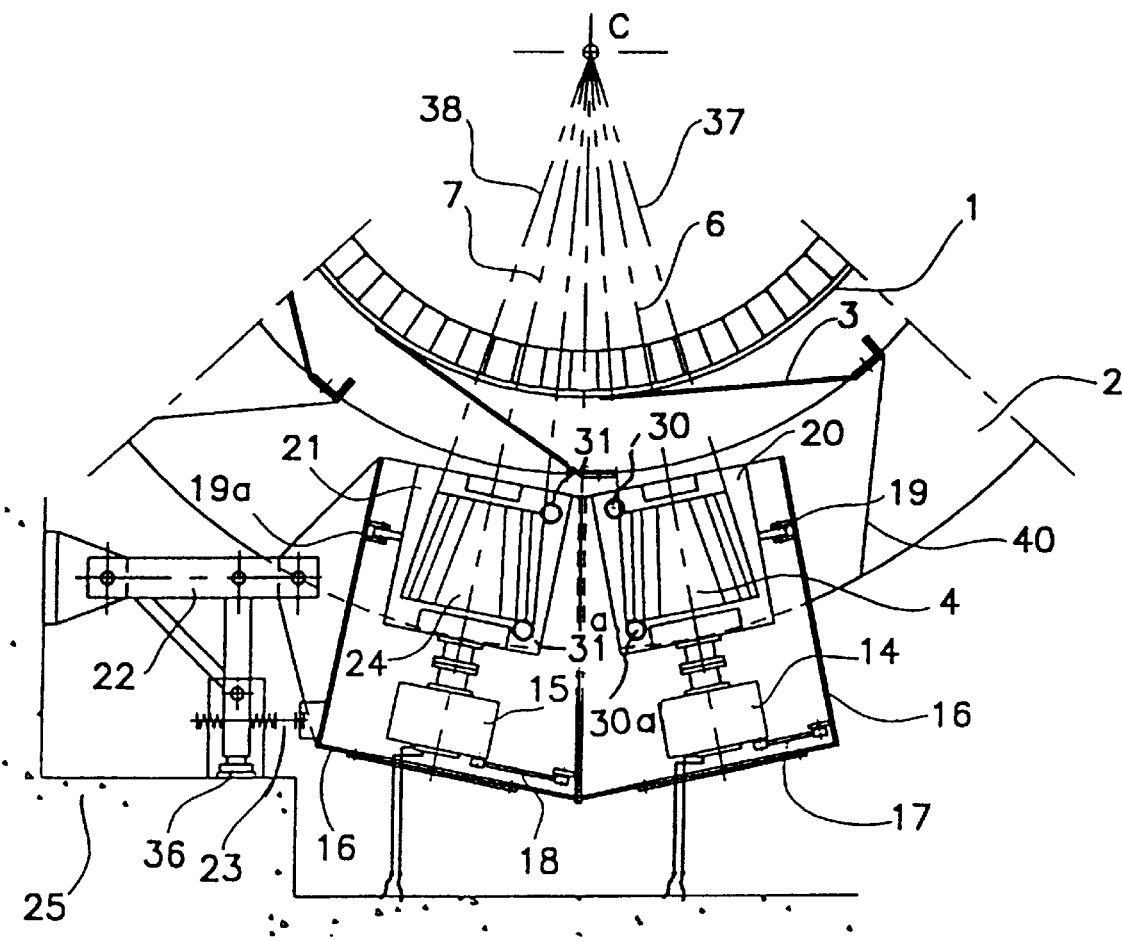
FIG. 2 is a partial sectional view in a radial plane (perpendicular to the furnace axis), of an embodiment of the invention comprising two pairs of rollers.

FIG. 2 shows the roller (4), the second roller (5) being hidden by the ring gear. It also shows a neighbouring roller (24). The rollers are driven by hydraulic motors (14) and (15).

The motor equipping the roller/roller support assembly is connected by a brace to the rigid structure, for instance a cradle or a frame (16) permitting torque absorption. In the particular case shown here, the support (20) of roller (4) and the support (21) of roller (24) are further connected to the rigid structure (16) through a swivelling articulation (respectively 19 and 19a) allowing the roller in question to move. according to the movements of the ring gear and of the actuator(s) (respectively 30. 30a and 31, 31a). The structure (16) is suspended for instance by a system of arms and articulations globally referenced (22), which system allows it to move relative to the anchor point such as the concrete block (25) in order to respond to the movements and/or deformations of the ring gear. Reference (23) designates a load compensating system such as a spring or a stack of spring washers provided for self-centering the rollers on the rotation center of the ring gear and hence of the furnace. Reference (36) designates a raceway.

FIG. 3 shows the two successive pairs of rollers (4.5) and (24, 25). In this preferred embodiment, the support (21) of roller (5) is integral with the rigid structure (16) through the adjusting screw (39) and the swivelling articulation (19c) while the supports (26), (27), (28) of the three other rollers (25), (4), (24) respectively are integral with hydraulic actuators (29), (30), (31) respectively, provided for pressing the rollers against the ring gear (2), as well as with swivelling articulations (19b), (19), (19a). respectively. The roller (5) does not require, in this case, any actuator as it acts on the ring gear by back pressure.

The structure (16) is connected to an articulated support (22) for compensating the weight of the structure (16), for absorbing the tangential stresses due to the driving torque of the drive rollers, for following the longitudinal movements of the structure (16), for compensating using an actuator (32) the longitudinal stresses due to the movements of said structure (16) and for avoiding the lifting of the structure (16) when the furnace rotates in the wrong direction. This structure may for instance be fabricated or made of cast iron.

In FIG. 3, it can be seen that the arms (22) are not perpendicular to the vertical connection wall (25) but that the structure (16) is substantially perpendicular to the wall. This corresponds to the case where the ring gear (2) has moved laterally relative to its normal position, for instance due to the longitudinal expansion of the cylinder. This movement is permitted by the spherical joints such as (33), (34) and (35) and by the raceway (36) (FIG. 2).

Figure 4:
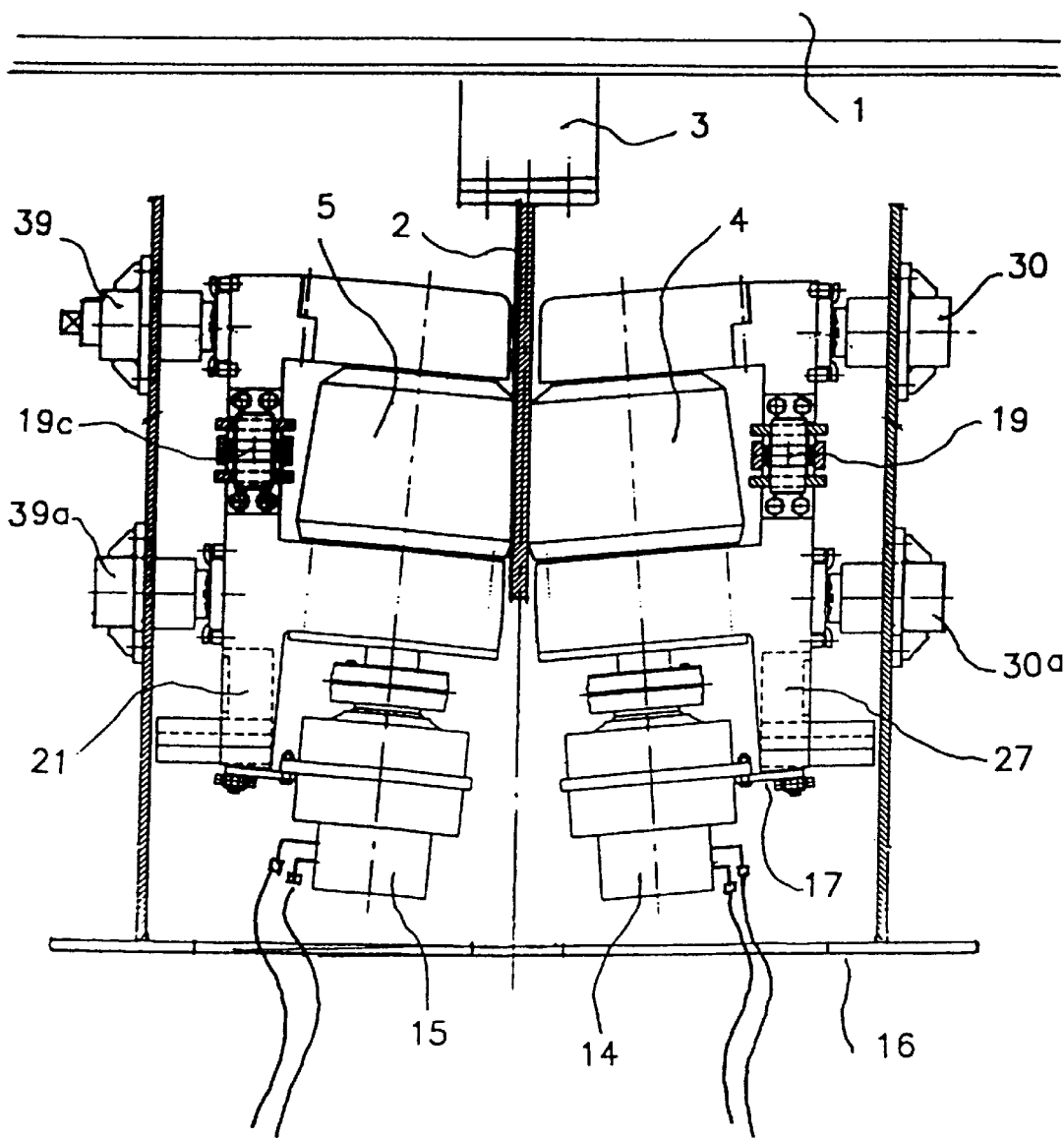
FIG. 4 is a section in a plane, parallel to the furnace axis, of the module along a section that is perpendicular to the section shown in FIG. 3.

FIG. 4 shows a pair of rollers comprised of a roller (4) connected to the actuators (30 and 30a) and driven by an hydraulic motor (14) and a roller (5) for positioning the module relative to the ring gear and comprising two adjusting means represented here by a mechanical adjusting element (39) and an actuator (39a). The initial position of the module relative to the ring gear (2) is fixed using the mechanical adjusting element (39). The actuator (39a) is provided to ensure the proper application of the generator of the roller (5) on the furnace ring gear. The force transmitted to the roller (4) is thus counteracted by the force transmitted to the roller (5). These devices give the rollers the freedom to move so as to respond to the possible tilting of the ring gear due to possible deformations of the furnace while transmitting a force that is substantially constant and drives the furnace by reverse rotation of the rollers.

In the present description, the word "substantially" is used to qualify certain terms. It must be taken in its usual meaning for those skilled in the art, namely to mean that small variations of the definitions are acceptable to adapt to the realities of industrial practice. The word "substantially" is equivalent to "approximately" or "globally".

The claims defining the invention are as follows:

1. A device for driving a cylinder (1) in rotation about its longitudinal axis, said cylinder resting on raceways permitting said rotation, said device comprising:
    a) at least one ring gear (2) having side faces that are substantially parallel to each other and substantially radial from (perpendicular to) the cylinder axis, said gear being substantially concentric with the cylinder and being arranged outside the cylinder and connected thereto by securing means (3) capable of withstanding distance variations between the cylinder and the ring gear.
    b) one or more modules each comprising a rigid structure (16), even numbers of truncated rollers (4, 5) and supports (27, 21) for the truncated rollers, said truncated rollers being capable of rotating about their longitudinal axes (6, 7) and being connected to their supports through ball or plain bearings, said truncated rollers having their generators (37, 38) intersect substantially on the cylinder axis at a point (C) which is substantially the center of the ring gear and being arranged in facing pairs on either side of the side faces of the ring gear and being capable of pressing on said side faces, at least one of the rollers being a drive roller whose function is to transmit a driving force to the ring gear,
    c) at least one actuator (30) for each pair of rollers, capable of exerting, through the roller supports, enough direct or indirect pressure on the rollers of said pair to firmly press said rollers against the ring gear and to enable them to drive both the ring gear and the cylinder in rotation, the actuator supports and the roller supports of each module being connected to said rigid structure, which comprises means (22) allowing it to move and change direction in response to the movements and direction changes experienced by the ring gear during its operation.

2. A device as claimed in claim 1, wherein the support of one of the rollers of a pair of rollers comprises at least one actuator and is mobile relative to the rigid structure, the support of the second roller of the pair being made integral with the rigid structure through at least one mechanical adjusting element.

3. A device as claimed in claim 1, wherein the support of each roller of a pair of rollers is articulated relative to the rigid structure.

4. A device as claimed in claim 1, wherein the module comprises two pairs of rollers and wherein the support of one roller only is integral with the rigid structure and comprises mechanical adjusting means, while the supports of the other three rollers are each connected to at least one actuator and are mobile relative to the rigid structure.

5. A device as claimed in 1, wherein the module is suspended and is connected to a fixed support through at least one articulated arm.

6. A device as claimed in 1, wherein the module comprises at least one actuator allowing it to be moved in a direction that is substantially parallel to the cylinder axis so as to respond to longitudinal movements of the cylinder or ring gear.

7. A device as claimed in 1, wherein the cylinder is a rotary furnace for firing minerals connected to a preheating tower and wherein the ring gear is located on the upstream overhanging portion of the furnace, on the side of the preheating tower.

8. A device as claimed in 7, wherein the fixed support to which the rigid structure is connected is integral with the building bearing the preheating tower.

9. A device as claimed in 1, wherein the drive rollers are rotatably driven by a hydraulic motor.

10. A device as claimed in 1, in which the contact between the rollers and the ring gear is a friction contact, the rollers and the ring gear being toothless.

11. A device as claimed in 1, comprising several modules that are independent from each other.

12. A device as claimed in 1, comprising several ring gears connected to the cylinder.

13. A device as claimed in 1, comprising two actuators for each mobile roller support, said actuators being situation in the same plane, substantially perpendicular to the ring gear.

14. A device as claimed in 1, comprising two adjusting elements for each roller support that is integral with the rigid structure, said adjusting elements being situated in the same plane, substantially perpendicular to the ring gear.

15. A device as claimed in 1, comprising one adjusting element that is integral with the rigid structure and one actuator, said adjusting element and said actuator being situated in the same plane, substantially perpendicular to the ring gear.

* * * * *

UNITED STATES PATENT AND TRADEMARK OFFICE
CERTIFICATE OF CORRECTION

PATENT NO. : 6,186,778
DATED : February 12, 2001
INVENTOR : Jacques Louis Bonin It is certified that error appears in the above-identified patent and that said Letters Patent is hereby corrected as shown below:

Column 8, line 4 (claim 1, line 1): delete "fixed".

Column 8, line 5 (claim 1, line 2): delete the second occurrence of "the" and insert --a--.

Signed and Sealed this

Twenty-ninth Day of May, 2001

*Attest:*

NICHOLAS P. GODICI

*Attesting Officer*     *Acting Director of the United States Patent and Trademark Office*